Patented July 14, 1942

2,289,993

UNITED STATES PATENT OFFICE 2,289,993

METHOD OF TREATING HIDES, SKINS, AND PELTS

Julius Pfannmuller, North Plainfield, N. J., and Hans Schleich, New Dorp, Staten Island, N. Y., assignors to Wallerstein Company, Inc., New York, N. Y., a corporation of New York No Drawing. Application February 16, 1939, Serial No. 256,718

4 Claims. (Cl. 195—6)

This invention relates to a method of treating hides, skins and pelts.

It is an object of the invention to provide a method of so treating hides, skins and pelts that the materials used in tanning penetrate more quickly and more effectively, resulting in a final product of superior quality. Other objects and advantages of the invention will be apparent from the following description.

In the production of leather, hides, skins and pelts are normally subjected to a series of operations including soaking, hair loosening, bating, pickling and tanning.

In the production of furs, the hides or skins are soaked and, without subjecting them to any hair loosening operation, are pickled and tanned or tawed.

In carrying out the present invention we subject the skins, hides or pelts to the action of a liquor having a pH of 6 or lower and containing the enzyme pepsin. Since the various operations above referred to include the use of liquors having a pH of 6 or under, the invention may be conveniently carried out by adding the pepsin to one of such liquors. For example, the normal pickling bath is a solution of salt and acid having a pH ranging from about 1 to about 6. The invention may, therefore, be conveniently carried out by adding pepsin to the usual pickling liquor.

While the amount of pepsin used may vary within a considerable range, only a relatively small amount is required to attain the desired results. For example about one-third of one per cent pepsin (U. S. P. IX) based on skin weight has been found satisfactory.

When skins, hides or pelts are treated as described they are softer in nature and have a greater permeability for air; the subsequent tanning operation proceeds more quickly and more uniformly; and the ultimate product is of superior quality.

The following procedures are given by way of example.

Example I

Soak 100 pounds sheep shearlings in water and scour any suitable detergent solution.

Transfer the skins to a pickling solution consisting of 500 pounds water to which has been added about 2 pounds sulphuric acid (66° Bé.) and 25 pounds sodium chloride. Stir for about ½ hour. Add ⅓ of a pound pepsin (U. S. P. IX), previously dissolved in water. This liquor has a pH of about 2. Leave skins in this liquor for upwards of 5 hours at room temperature. They are then ready for subsequent normal processes including tanning.

Example II

Unhair and bate 100 pounds goatskins. Transfer skins to a drum containing 75 pounds of water at 75° F. to which has been added 25 pounds sodium chloride and 3 pounds sulphuric acid (66° Bé.). Drum skins for ½ hour. Add ⅓ of a pound pepsin (U. S. P. IX), previously dissolved in water. Drum the skins for ½ hour. The skins are then ready for subsequent normal processes including tanning.

Example III

Soften 100 pounds of sheep shearlings in accordance with our application, Serial No. 256,717, relating to the use of urea and urease, filed of even date herewith, and proceed as per Example I.

What is claimed is:

1. In the preparation of skins, hides and pelts for the production of furs, the improvement which consists in subjecting the skins, hides or pelts to the action of a liquor having a pH under 6 and containing the enzyme pepsin.

2. In the preparation of skins, hides and pelts for the production of furs, the improvement which consists in adding the enzyme pepsin to the usual pickling bath.

3. In the preparation of leather, the improvement which consists in subjecting the skins or hides, subsequent to bating and prior to tanning, to the action of a liquor having a pH under 6 and containing pepsin.

4. In the preparation of leather, the improvement which consists in subjecting the skins or hides, subsequent to bating and prior to tanning, to the action of a pickling bath to which has been added pepsin.

JULIUS PFANNMULLER.
HANS SCHLEICH.